United States Patent [19]

Kranenberg

[11] Patent Number: 5,002,251
[45] Date of Patent: Mar. 26, 1991

[54] HOOD ORNAMENT RETAINING DEVICE

[76] Inventor: Stephen B. Kranenberg, 5044 Primrose, Kentwood, Mich. 49548

[21] Appl. No.: 407,535

[22] Filed: Sep. 15, 1989

[51] Int. Cl.5 .............................................. B62D 25/00
[52] U.S. Cl. .................................... 248/503; 248/551
[58] Field of Search ............... 248/503, 551, 548, 900, 248/500, 499; 70/258; 180/69.24

[56] References Cited

U.S. PATENT DOCUMENTS

| | | | |
|---|---|---|---|
| 2,904,303 | 9/1959 | Gentiline | 248/499 |
| 3,692,965 | 9/1972 | Gardner | 70/258 X |
| 4,015,761 | 4/1977 | Kokko | 248/503 X |
| 4,065,092 | 12/1977 | Spinks, Sr. et al. | 248/503 |
| 4,201,398 | 5/1980 | Meier | 70/258 X |
| 4,648,618 | 3/1987 | Utman et al. | 70/258 X |

*Primary Examiner*—Karen J. Chotkowski

*Attorney, Agent, or Firm*—Price, Heneveld, Cooper, DeWitt & Litton

[57] ABSTRACT

A hold down assembly for removable vehicle accessories comprises a rigid friction rod, which depends from the accessory, and a retaining assembly, which consists of a retaining disc, a spring, a spring base disc, an actuator cable, and a cable ferrule. In the operation of the holding assembly, the rigid friction rod is inserted into the retaining assembly and enters an aperture of the retaining disc which guides and directs the rod end through the center of the spring and into an aperture of the spring base disc. The pulling force exerted on the actuator cable causes the ferrule to exert a downward eccentric pressure on the retaining disc. When subjected to such off-center pressure, the retaining disc is pulled down in a tilted fashion causing an engaging edge of the retaining disc to bite into the rigid friction rod.

18 Claims, 2 Drawing Sheets

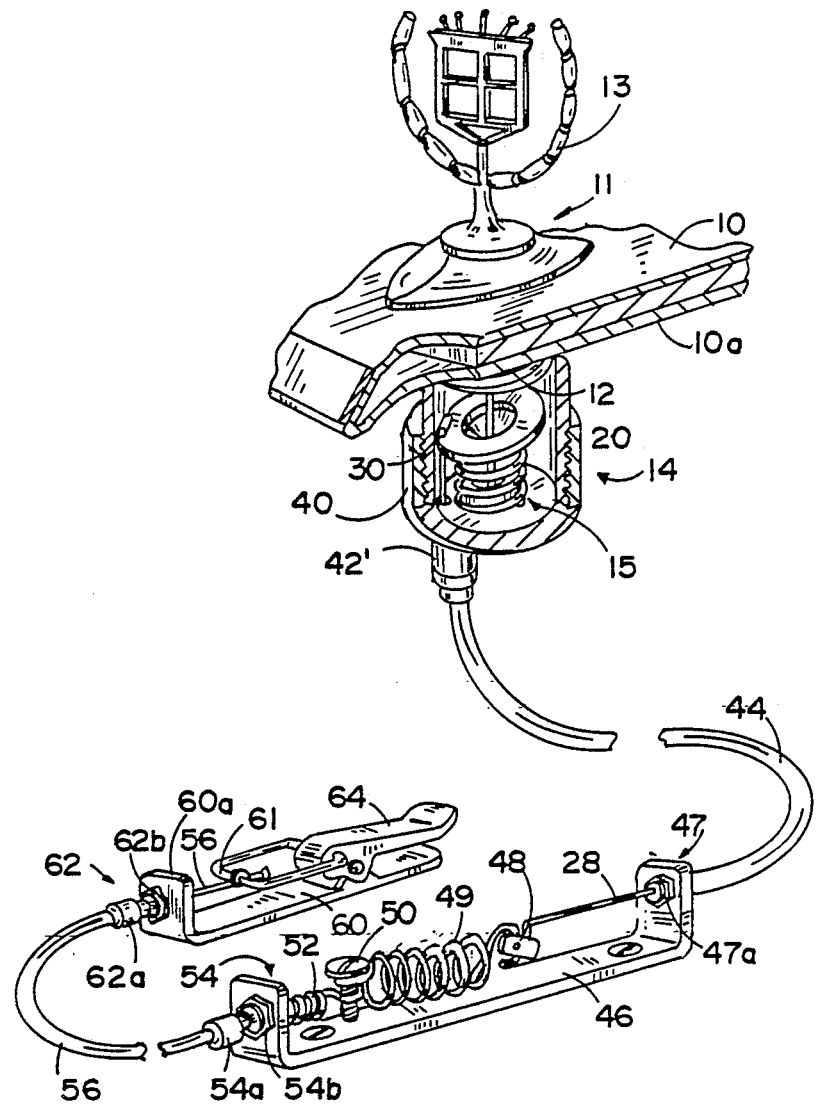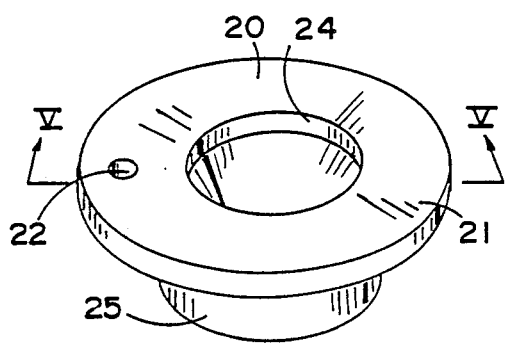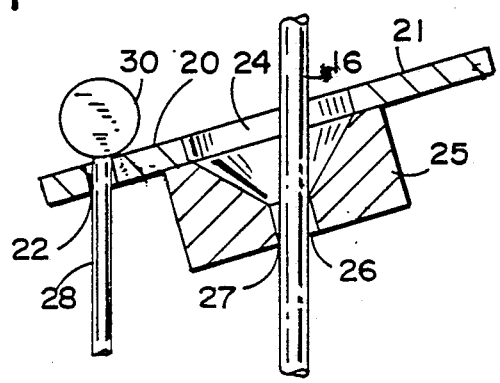

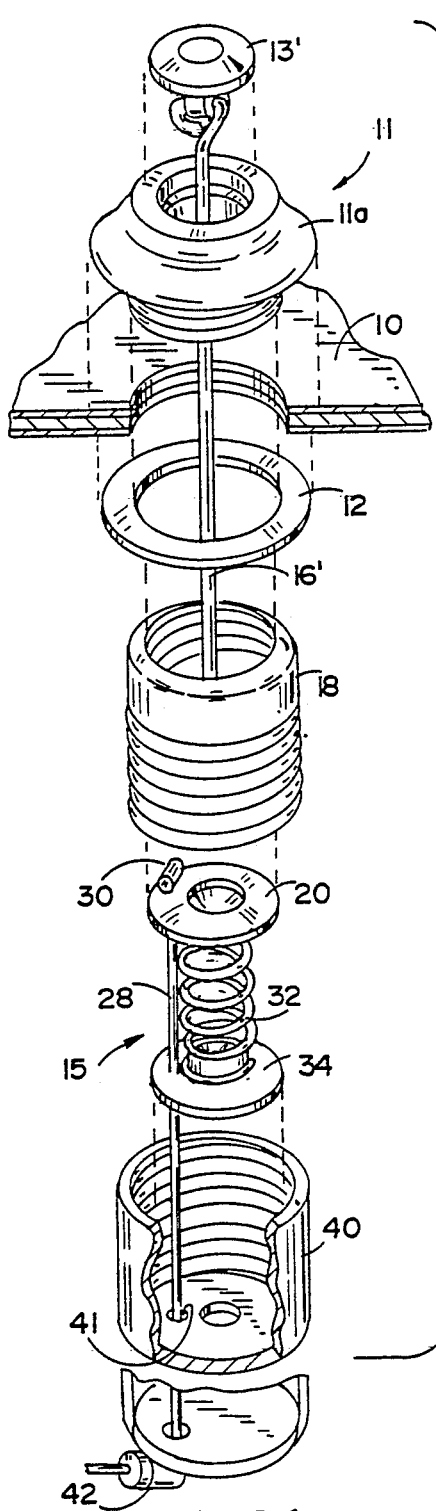
FIG. 2
FIG. 2A
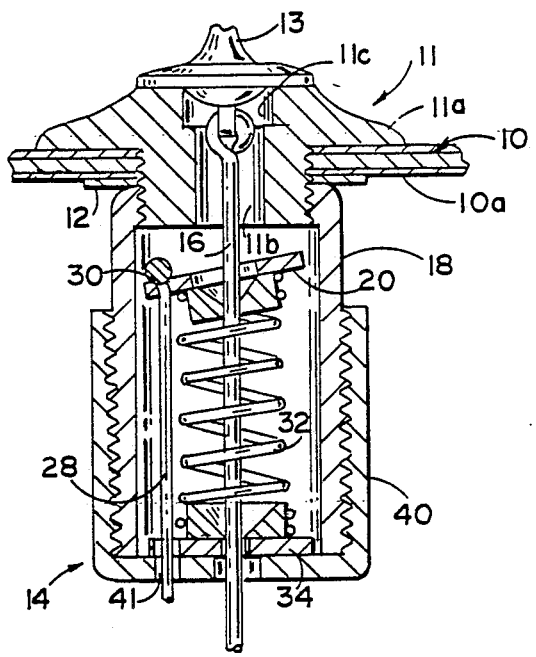
FIG. 3
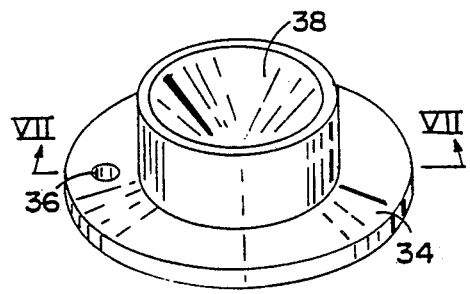
FIG. 6
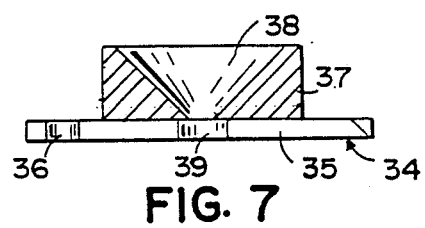
FIG. 7

HOOD ORNAMENT RETAINING DEVICE

FIELD OF THE INVENTION

This invention relates to a hold down assembly for removable vehicle accessories and, more particularly, to an ornament retaining assembly for removable vehicle ornaments such as hood ornaments.

BACKGROUND OF THE INVENTION

A standard by which many people measure their success in life is the automobile which they drive. In most areas of the world, simply owning an automobile gives one immense status. In the more affluent industrial nations of the world, however, one's status is more dependent upon the make and model of the automobile he drives.

Many of the most prestigious automobiles manufactured in the world attempt to distinguish themselves from one another by means of distinctive hood ornaments. These hood ornaments both represent and possess the status and prestige of the automobile upon which they are located. Because these ornaments have come to represent a certain level of affluence, power and prestige, they are now a much sought after commodity in and of themselves. As a result, there has been an increasing problem with the theft of these ornaments from the hoods of these prestigious automobiles.

Among the means devised to thwart this problem of "ornament-theft" is the use of a power retractable hood ornament. Although this is a viable method, it is an extremely expensive and complicated means of doing so.

Another means for preventing the loss of the hood ornament is to make the ornament portable such that the owner of the car could take the ornament with him whenever he is going to leave the car unattended. In the past, this was accomplished by making it possible to screw the hood ornament into the hood or, as on much older models of cars, by attaching the hood ornament to a radiator cap. The disadvantage of this method, though, is that the owner of the vehicle is forced to take the ornament with him each time he leaves the car unattended because of the ease by which someone else could remove the ornament. Also, there is the inherent risk associated with removing the cap of the radiator after the vehicle has been operated.

Hood ornaments of automobiles, especially hood ornaments of "prestigious" automobiles, are vulnerable to theft or breakage. Previous solutions to this problem are either expensive, inconvenient or potentially dangerous. Accordingly, there exists a desire in the art for an improved device that will provide a means to reduce the incidence of theft or damage to the hood ornaments of automobiles.

SUMMARY OF THE INVENTION

The present invention relates to a hold down assembly for removable vehicle accessories. The assembly is comprised of a holding means for engaging and releasing an accessory in a position on a vehicle and a release means for operating the holding means from a remote location when desired. When engaged in the holding means, the accessory retains limited movement around the position on the vehicle.

In a preferred form, the holding means is a retaining disc having a sharp knife-like edge which is drawn against a rod connected to the vehicle accessory, such as a hood ornament. The sharp edge bites into the rod to retain the accessory or ornament in place. Preferably, the release means is a lever actuator connected to an elongated cable and a coil spring which allows the accessory or ornament limited movement about its mounted position. Thus, if the ornament is struck by a person, or hits an object such as a garage door, injury to the person and breakage of the ornament itself are avoided.

The invention has numerous advantages over prior accessory/ornament attachments. The assembly may be easily fitted to new or existing vehicle hoods or other parts since it is small and compact. The actuator may be positioned within the vehicle interior or at another location remote from the accessory or ornament to facilitate driver operation and control. The device effectively allows rapid removal of an ornament or other accessory when a person leaves a vehicle to prevent the opportunity for theft. Appropriate biasing springs are incorporated to prevent looseness and rattling of components both when the ornament is attached or removed. Moreover, the retention power of the device is easily sufficient to resist even the most concerted attempts at unauthorized removal. Further, the device is useful with various types of accessories other than hood ornaments, such as exterior mirrors, decorative panels, sensors, or other parts which may be removably fitted to a vehicle.

These and other objects, advantages, purposes and features of the invention will become more apparent from a study of the following description taken in conjunction with the drawings.

BRIEF DESCRIPTION OF THE DRAWINGS

FIG. 1 is a schematic view of the hold down assembly in operation;

FIG. 2 is an exploded view of the holding means for engaging or releasing the accessory;

FIG. 2A is a fragmentary, perspective view of the lower end of the holding assembly illustrating an alternate cable directing device;

FIG. 3 is a cross-sectional view of the holding means of FIG. 2 in operation;

FIG. 4 is a top perspective view of the retaining disc of the holding means;

FIG. 5 is a cross-sectional view of the retaining disc of FIG. 4;

FIG. 6 is a perspective view of the spring base of the holding means;

FIG. 7 is a cross-sectional view of the spring base of FIG. 6.

DESCRIPTION OF THE PREFERRED EMBODIMENTS

Referring to the drawings and particularly FIG. 1, there is shown a portion of an automobile hood 10. The automobile hood 10 includes an accessory base 11 having an exposed portion 11a on its exterior surface, a depending, threaded tubular shaft 11b (FIG. 3) connected to exterior base portion 11a, and a nut 12 for securing base 11 to an underside 10a of hood 10. Shaft 11b passes through a correspondingly sized aperture in hood 10. A hood ornament or other accessory 13 or 13' is attached to the exposed base portion 11a by a holding assembly 14. The holding assembly 14 consists of a retaining assembly 15 enclosed within an inner housing 18 and an outer housing 40. The inner housing 18 is attached to the underside 10a of the hood 10 by means of threading it onto the threaded shaft 11b. The outer housing 40 is attached to the inner housing 18 by threading it onto the threaded outer surface of the inner housing 18. In the operation of holding assembly 14, a rigid friction rod 16, which pivotally depends from the accessory 13 or 13', is inserted into the retaining assembly 15 as shown in FIG. 3. As explained below, the retaining assembly engages and clamps rod 16 to hold the accessory or ornament 13 or 13' in position.

As is best seen in FIGS. 2 and 3, the retaining assembly 15 consists of a retaining disc 20, a spring 32, a spring base disc 34, an actuator cable 28, and a cable ferrule 30. Retaining disc 20 has a planar, circular base 21, a conical shaped aperture 24 in a reduced diameter, cylindrical projection 25 leading to a cylindrical aperture 26, and a sharp, rod engaging, gripping or biting edge 27 for receiving, gripping and retaining rigid friction rod 16 (FIGS. 3-5).

An aperture 22 is provided near the periphery of base 21. Preferably, disc 20 is formed from hardened steel and is harder than the preferably metallic material of rod 16 into which it bites and grips. It has been found that when disc 20 has a hardness of 70 on the Rockwell Scale, while rod 16 has a Rockwell Hardness of 40, that the rod is properly and securely retained in the manner described below. Also, the diameters of the wide end of aperture 24 and of aperture 26 are sufficiently larger than the diameter or width of rod 16 to allow tipping of disc 20 sufficiently to allow edge 27 to firmly bite into and hold rod 16.

The spring base disc 34 is seated on the interior bottom of the outer housing 40. Disc 34 also includes a circular base 35 and a cylindrical, reduced diameter projection 37 having a conical aperture 38 leading to a cylindrical aperture 39. An aperture 36 is provided near the periphery of base 35. A coil spring 32, which is located between and attached and telescoped over both the retaining disc projection 25 and spring base disc projection 37, serves to support the retaining disc 20 in an elevated fashion within the inner housing 18. Spring 32 also provides a pivot point about which disc 20 is tipped when cable 28 is actuated.

Actuator cable 28 connects the retaining assembly 15 with a U-shaped bracket 46 (FIG. 1). Cable ferrule 30 secures one end of cable 28 to the retaining disc 20 through aperture 22. Cable 28 extends through hole 22 in the retaining disc 20, parallel to the spring 32, through hole 36 in the spring base disc 34 and exits the holding assembly 14 through a hole 41 in the outer housing 40. Disc 34 and aperture 36 thus guide cable 28. Upon leaving housing 40, cable 28, which is connected to the housing by rigid, tubular fastener 42', is covered by a flexible sheath 44 within which it slides until it contacts the U-shaped bracket 46. Prior to encasing the cable 28 in the flexible sheath 44, the angle of direction of the cable 28 may be adjusted by a 90° cable attachment 42 including a roller or the like about which the cable passes (FIG. 2A).

Sheath 44 has a tubular, rigid end fitting connected to a first end of the U-shaped bracket 46 by a fastening means 47 consisting of a nut 47a and a second nut (not shown). The cable is connected to a clamp 48 which, by means of a threaded fastener, engages the cable 28 as well as the first end of a coil spring 49. A clamp 50, which is identical to and operates in the same manner as the clamp 48, engages the second end of spring 49 and a first end of a connecting cable 56. Connecting cable 56, which connects the U-shaped bracket 46 with an L-shaped bracket 60, is also covered with a flexible sheath 57 between the bracket 46 and the bracket 60. A biasing spring 52 surrounds the portion of the connecting cable 56 between the clamp 50 and the second end of the U-shaped bracket 46. Spring 52 functions as a take up spring which urges clamp 50 away from the second bracket end to prevent play or looseness in the cable assembly when actuator or buckle 64 is released. Sheath 57 is connected to the second end of the U-shaped bracket 46 by a fastener 54 consisting of a rigid, tubular end fitting 54a, nut 54b, and a second nut (not shown). Sheath 57 is also connected to the first end 60a of the L-shaped bracket 60 by an identical fastening assembly 62 consisting of a tubular end fitting 62a, a nut 62b and a second nut (not shown). Connecting cable 56 then passes through the first end of the L-shaped bracket 60 where it connects to a connecting link 61 pivotally connected to overcenter buckle actuator 64. Buckle or actuator 64 is pivotally mounted to bracket 60 at a position spaced from its first end 60a.

In operation the rigid friction rod 16, which pivotally depends from ornament 13, is inserted through an aperture 11c (FIG. 3) in the accessory base 11 and enters the top of retaining assembly 15. As shown, rod 16 is long enough to fit through combined housings 18, 40 and through discs 20, 34 and spring 32. In the retaining assembly 15, the rigid friction rod 16 enters aperture 24 of the retaining disc 20 which guides and directs the rod end into aperture 26. The rod then extends through the center of the spring 32, and enters aperture 38 of disc 34. Overcenter buckle 64 is then rotated from left to right in FIG. 1, exerting a pulling force on the connecting cable 56. This pulling force causes the connecting cable 56 to slide within sheath 57 and exert the first pulling force on the spring 49 This, in turn, causes the spring 49 to pull on the cable 28. When cable 28 is pulled, ferrule 30 exerts a downward, eccentric pressure on disc 20. This downward eccentric pressure on disc 20 is an off-center pressure because of the location of aperture 22 near the periphery of the disc where cable 28 pierces the retaining disc 20. When subjected to such off-center pressure, retaining disc 20 is pulled down in a tilted fashion (FIG. 3), causing engaging edge 27 to bite into the rigid friction rod 16. Edge 27 firmly grips rod 16 since the rod is prevented from any downward movement by engagement of ornament 13 with exposed base position 11a.

Although ornament 13 is firmly retained, it is still capable of flexible rotation. Such flexible rotation is a result of coil spring 49 which will stretch in an axial direction if sufficient force is applied to rod 16 to move it upwardly as shown in FIG. 3. Such force can occur, for example, if ornament 13 is pushed or struck laterally causing the pivotal connection point of rod 16 to be raised. Alternately, if someone lifts ornament 13 vertically, disc 20 will continue to bite, grip and resist release unless cable 28 is released and disc 20 disengages from rod 16. This is because spring 49 will stretch but disc 20 is maintained at an angle to rod 16 even if rod 16 is pulled upwardly far enough to engage disc 20 with the bottom of threaded tubular shaft 11b. In such case, cable ferrule 30 acts as a stop against the bottom of shaft 11b to maintain the disc 20 at such angle. The distance that rod 16 travels vertically allows flexible rotation of the ornament without making the rod susceptible to tampering, for example, by wire cutters.

As will be understood from FIG. 2, should ornament 13 be removed, a plug or cover 13' having a rod 16' identical to that used with ornament 13 can be inserted in the assembly to close the opening in base 11. Disc 20 will grip rod 16' on cover 13' in the same manner as described above for rod 16 on ornament 13.

Alternately, if limited flexibility about the supported position of ornament 13 is not desired, coil spring 49 could be eliminated. Yet, spring 49 provides a convenient biasing force allowing use of overcenter actuator 64 and constantly urges ornament 13 into position on base 11. Also, actuator or buckle 64 could be replaced with other mechanical or powered mechanisms or assemblies for pulling cable 28 to tilt and engage disc 20 with rod 16 or 16'. For example, cams, ratchets or other devices could be used. Likewise, cable 28 could be replaced with other devices for engaging and tilting disc 20.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows.

What is claimed is:

1. A hold down assembly for removable vehicle accessories comprising:
   a holding means for engaging and releasing said accessory to removably hold the accessory in a position on the vehicle; and
   a release means for operating said holding means from a remote location to attach and release the accessory when desired;
   said holding means including a housing having an opening, said opening adapted to receive an elongated rigid rod extending into said housing; and
   retaining means disposed within said housing for releasably retaining said rod within said housing, said retaining means including a rod-engaging member having a sharp edge for gripping the elongated rod.

2. The hold down assembly of claim 1, wherein said retaining means includes an elevating means for elevating said rod-engaging member, said member including an aperture allowing the rod to pass therethrough for engagement with said sharp edge.

3. The hold down assembly of claim 2, wherein said rod-engaging member is a circular disc having an aperture therethrough, said sharp edge being an edge of said aperture.

4. The hold down assembly of claim 1, wherein said release means includes means for rotating said rod-engaging member to engage said sharp edge with said rod.

5. The hold down assembly of claim 1, wherein said release means includes an actuating cable and an actuator for engaging said rod-engaging member with said rod, said actuator being of a size and in a position to engage a depending shaft of the vehicle to provide a means for maintaining the engagement of said rod-engaging member with said rod.

6. The hold down assembly of claim 5, wherein said release means includes a biasing means allowing accessory movement.

7. A hold down assembly for removable vehicle accessories comprising:
   a holding means for engaging and releasing said accessory to removably hold the accessory in a position on the vehicle; and
   a release means for operating said holding means from a remote location to attach and release the accessory when desired;
   said holding means including a housing having an opening, said opening adapted to receive an elongated rigid rod extending into said housing; and
   retaining means disposed within said housing for releasably retaining said rod within said housing, said retaining means including: a disc, having a cup shaped recess, a centrally disposed aperture for receiving the rod, an off-center aperture, and a rod engaging surface for retaining the rod;
   a spring for supporting said disc in an elevated fashion;
   a spring base disc, having a cup shaped recess, a centrally disposed aperture for receiving the rod, and an off-center aperture;
   an actuator cable coursing through said off-center aperture of said disc, through said off-center aperture of said spring base disc and out of said housing; and
   a cable ferrule attached to the end of said actuator cable which allows contact with said disc.

8. The hold down assembly of claim 7, wherein said cable ferrule is of a size sufficient to provide a means for maintaining the engagement of said rod-engaging member with said rod.

9. A hold down assembly for removable vehicle accessories comprising:
   holding means for engaging and releasing an accessory to removably hold the accessory in a position on the vehicle;
   release means for operating said holding means from a remote location to attach and release the accessory when desired; and
   means allowing limited movement of the accessory around said position;
   said holding means including a housing having an opening, said opening adapted to receive an elongated rigid rod extending into said housing; and
   retaining means disposed within said housing for releasably retaining said rod with said housing, said retaining means including a rod-engaging member having a sharp edge for gripping the elongated rod.

10. The hold down assembly of claim 9, wherein said retaining means includes an elevating means for elevating said rod-engaging member, said member including an aperture allowing the rod to pass therethrough for engagement with said sharp edge.

11. The hold down assembly of claim 10, wherein said rod-engaging member is a circular disc having an aperture therethrough, said sharp edge being an edge of said aperture.

12. The hold down assembly of claim 9, wherein said release means includes means for rotating said rod-engaging member to engage said sharp edge with said rod.

13. The hold down assembly of claim 9, wherein said release means includes an actuating cable and an actuator for engaging said rod-engaging member with said rod, said actuator being of a size and in a position to engage a depending shaft of the vehicle to provide a means for maintaining the engagement of said rod-engaging member with said rod.

14. The hold down assembly of claim 13, wherein said release means includes a biasing means allowing accessory movement.

15. An ornament retaining assembly for removable vehicle ornaments comprising:
   an accessory having a rigid rod depending therefrom;
   a retaining disc having an aperture therethrough and a rod engaging surface;
   positioning means for positioning the disc for receiving the rod; and
   operating means for moving the disc to engage and hold the rod.

16. The ornament retaining assembly of claim 15, wherein said rod-engaging surface has a sharp edge for gripping the rigid rod.

17. The ornament retaining assembly of claim 15, wherein said positioning means includes means for elevating said retaining disc for receiving the rod.

18. The ornament retaining assembly of claim 15, wherein said operating means includes an actuating cable and an actuator for moving said disc to engage and hold said rod, said actuator being of a size and in a position to engage a depending shaft of the vehicle to provide a means for maintaining the engagement of said rod-engaging member with said rod.

* * * * *

UNITED STATES PATENT AND TRADEMARK OFFICE
CERTIFICATE OF CORRECTION

PATENT NO. : 5,002,251
DATED : March 26, 1991
INVENTOR(S) : Stephen B. Kranenberg It is certified that error appears in the above-identified patent and that said Letters Patent is hereby corrected as shown below:

Column 2, line 65:

Before "base" insert --accessory--

Column 6, claim 9, line 45

"with" should be --within--

Signed and Sealed this

First Day of September, 1992

Attest:

DOUGLAS B. COMER

Attesting Officer    Acting Commissioner of Patents and Trademarks